Sept. 8, 1959  F. D. PFENING  2,903,301
METHOD AND APPARATUS FOR HANDLING FLOUR
Filed April 17, 1957  7 Sheets-Sheet 1

INVENTOR.
FREDERIC D. PFENING
BY
Schmieding and Fultz
ATTORNEYS

Sept. 8, 1959 F. D. PFENING 2,903,301
METHOD AND APPARATUS FOR HANDLING FLOUR
Filed April 17, 1957 7 Sheets-Sheet 2

INVENTOR.
FREDERIC D. PFENING
BY
Schmieding and Fultz
ATTORNEYS

Sept. 8, 1959  F. D. PFENING  2,903,301
METHOD AND APPARATUS FOR HANDLING FLOUR
Filed April 17, 1957  7 Sheets-Sheet 4

INVENTOR.
FREDERIC D. PFENING
BY
Schmieding and Fultz
ATTORNEYS

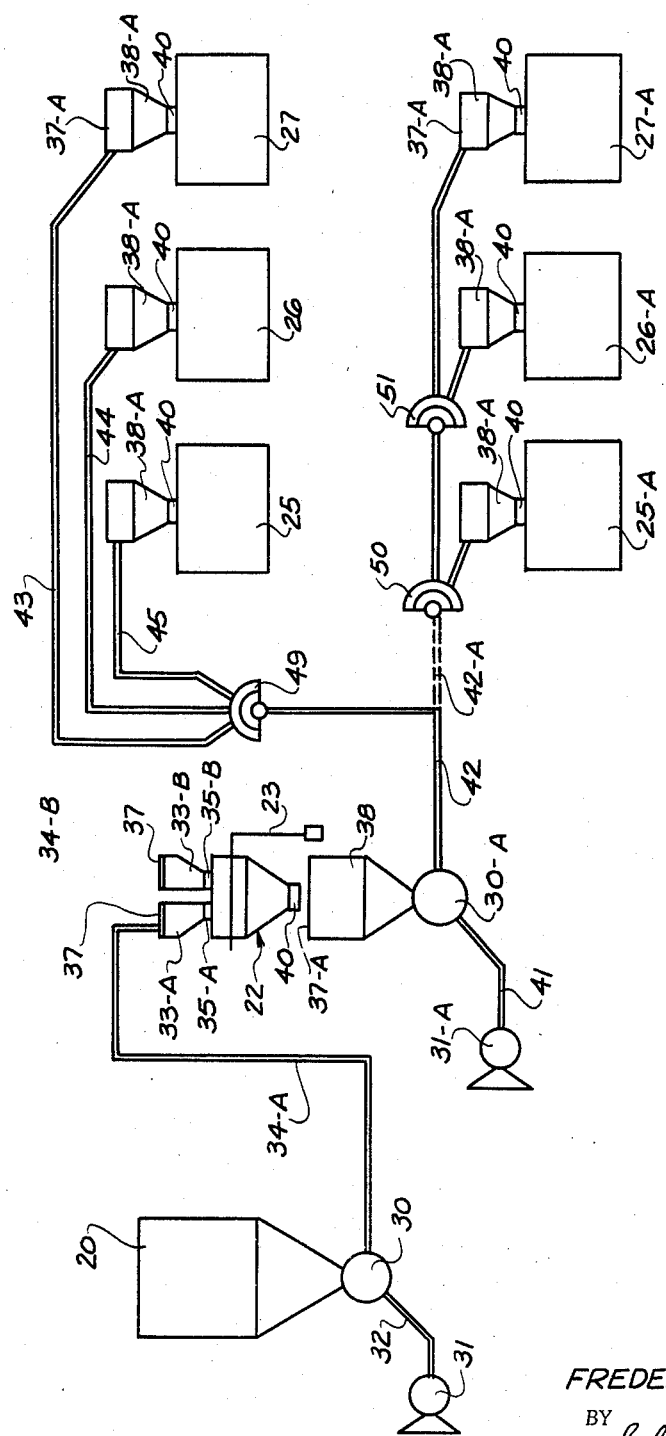

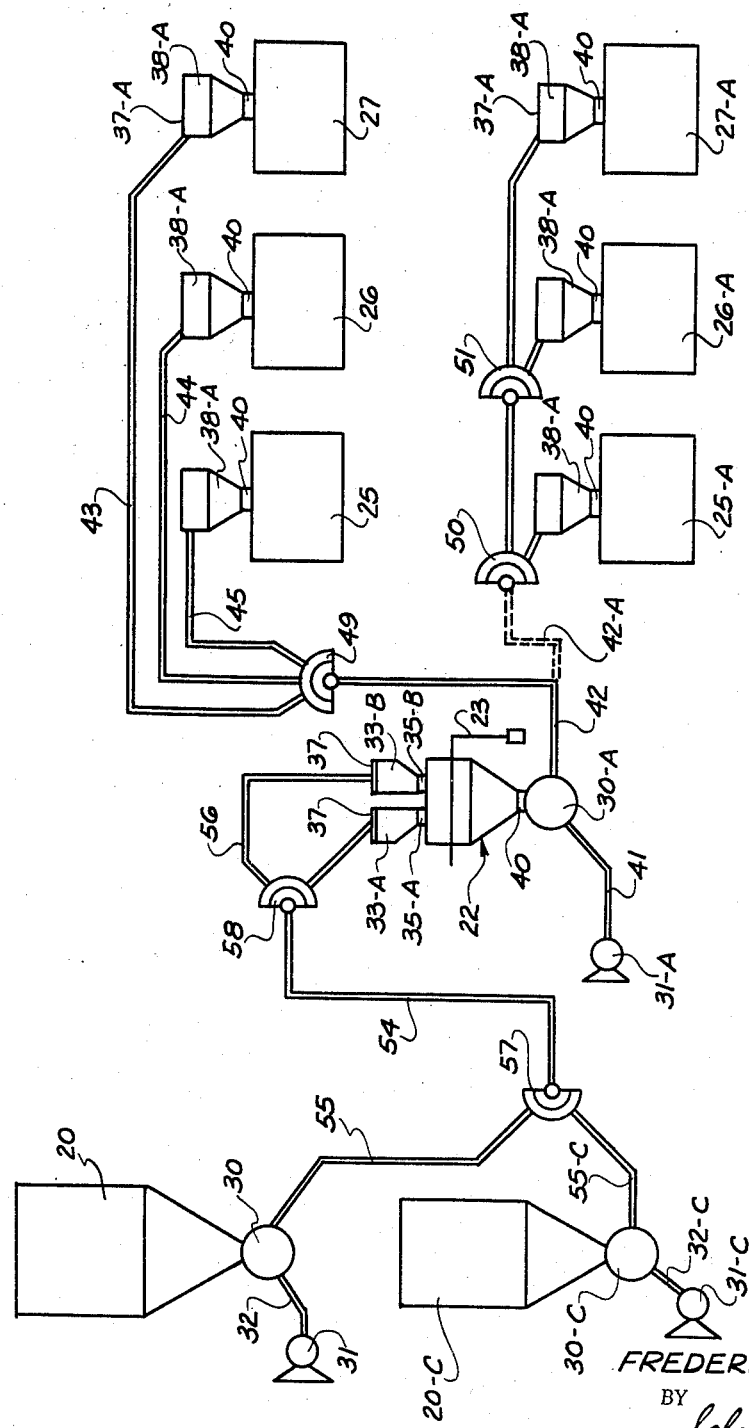

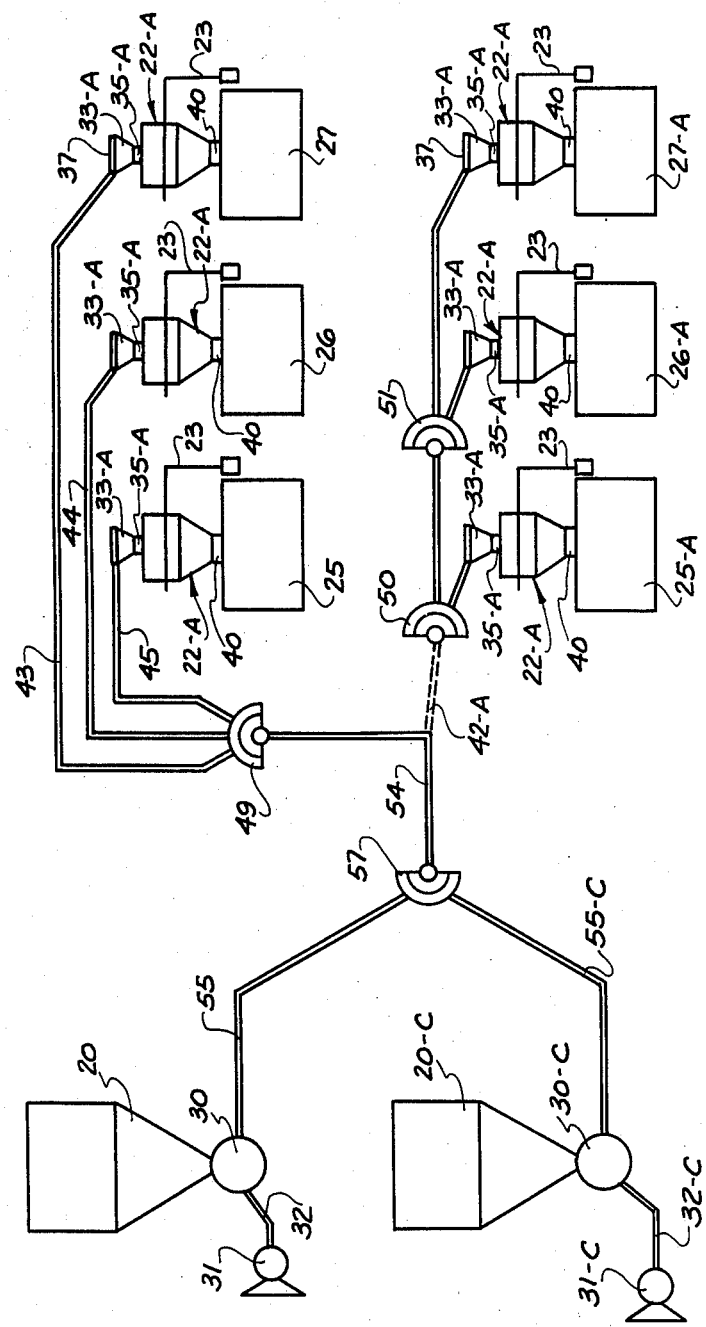

United States Patent Office 2,903,301
Patented Sept. 8, 1959

2,903,301

METHOD AND APPARATUS FOR HANDLING FLOUR

Frederic D. Pfening, Columbus, Ohio, assignor to The Fred D. Pfening Co., Columbus, Ohio, a corporation of Ohio Application April 17, 1957, Serial No. 653,339

5 Claims. (Cl. 302—28)

This invention relates to novel method and apparatus for the automatic handling of finely divided particles such as flour or other ingredients used in large scale bakery operations.

In general the present invention is applicable to pneumatic conveying systems for flour of the type wherein flour is transported from one or more storage means to a central weighing apparatus or scale hopper where charges of flour are successively weighed and delivered to one or more mixers. As another aspect, the present invention is also applicable to flour handling systems wherein flour is transported from one or more storage means to any one of a plurality of scale hoppers where charges of flour are weighed and thence delivered to any one of a plurality of mixers. In systems of this type the flour is transferred from a storage means to a scale hopper via a conduit of flowing air to which the particles of flour are delivered by means of a suitable feeder such that the particles of flour are entrained in the flowing air and hence moved through the conduit to the scale hopper. After the desired weight of flour has been delivered to a scale hopper the flow must be terminated at the intake to the scale hopper. Moreover, it is necessary to terminate the delivery of particles to the flowing air at the feeder while continuing the flow of air through the conduit leading from the feeder to the scale hopper until such conduit has been freed of the line charge of flour entrained in the flow in the conduit at the time the flow is terminated at the intake of the scale hopper. It is necessary to remove such line charge from the conduit prior to terminating the flow of air since if the flowing flour is allowed to become static in the conduit the conduit will become clogged with flour next time the flow of air commences.

According to the present invention the systems thereof are provided with novel means for delivering precisely weighed charges of flour to a scale hopper and for clearing the line charges from the delivery conduits. Such novel means comprises a residue hopper and valve mechanism located at the intake to the scale hopper and adapted to receive the flow of air and flour. The flowing air is released from the residue hopper to the environment but the flour is delivered from the residue hopper to the scale hopper until the desired charge has been weighed at which time a simple shut-off valve terminates delivery of flour from the residue hopper to the scale hopper but the residue hopper continues to receive the flow of air and flour until the previously mentioned line charge of flour has been cleared from the conduit and deposited in the residue hopper. By incorporating such novel residue hopper arrangements in the systems of the present invention the use of a closed loop return circuit is avoided whereby the total length of conduit required is greatly reduced. Moreover, the valving mechanisms of the present systems are greatly simplified by the elimination of closed loop return circuits wherein relatively expensive diverter valves are required.

As another aspect of the present invention two or more of the above mentioned residue hoppers are arranged to feed into a single scale hopper for weighing into a single combination batch. In this manner the apparatus can be utilized to effect blending of two or more varieties of flour, or flour, sugar and other ingredients with accuracy and dispatch. For example, it is sometimes desirable to blend Kansas Winter wheat flour with Minnesota Spring wheat flour, or patent white flour with other grades. By prior practices such blending has been done by dumping together the required number of bags of each ingredient, or by a plurality of screw conveyors feeding into a common collector with the revolutions per minute of the variable speed drives being set at certain speeds to roughly proportion the ingredients. With the systems of the present invention, however, a plurality of residue hoppers, feeding into a common scale hopper, provide a novel apparatus whereby a plurality of ingredients can be rapidly blended in precise proportions.

It is therefore an object of the present invention to provide improved pneumatic conveying systems for flour or the like which systems are adapted to deliver accurately weighed charges of flour to a scale hopper and clear the delivery conduits of line charges by means of a novel flour delivery circuit comprising a residue hopper for receiving said line charges.

It is another object of the present invention to provide improved pneumatic conveying systems for flour or the like which systems are adapted to both deliver accurately weighed charges of flour to a scale hopper and clear the delivery conduits of line charges without the need for complex and expensive valve mechanisms.

It is another object of the present invention to provide a flour handling system of the type described that is adapted to selectively deliver various types of flour to a central weighing apparatus.

It is another object of the present invention to provide an apparatus of the type described that is adapted to selectively deliver charges of flour from a central weighing apparatus to a plurality of mixers.

It is still another object of the present invention to provide novel flour handling systems of the type described that are adapted to rapidly blend a plurality of flour types, or other ingredients, in precisely proportional relationship.

Further objects and advantages of the present invention will be apparent from the following description, reference being had to the accompanying drawings wherein preferred forms of embodiments of the invention are clearly shown.

In the drawing:

Figure 5 is a diagrammatic view of a fifth flour handling system constructed according to the present invention and comprising another aspect thereof;

Figure 6 is a diagrammatic view of a sixth flour handling system constructed according to the present invention and comprising another aspect thereof;

Figure 7 is a diagrammatic view of a seventh flour handling system constructed according to the present invention and comprising another aspect thereof;

Figure 1:
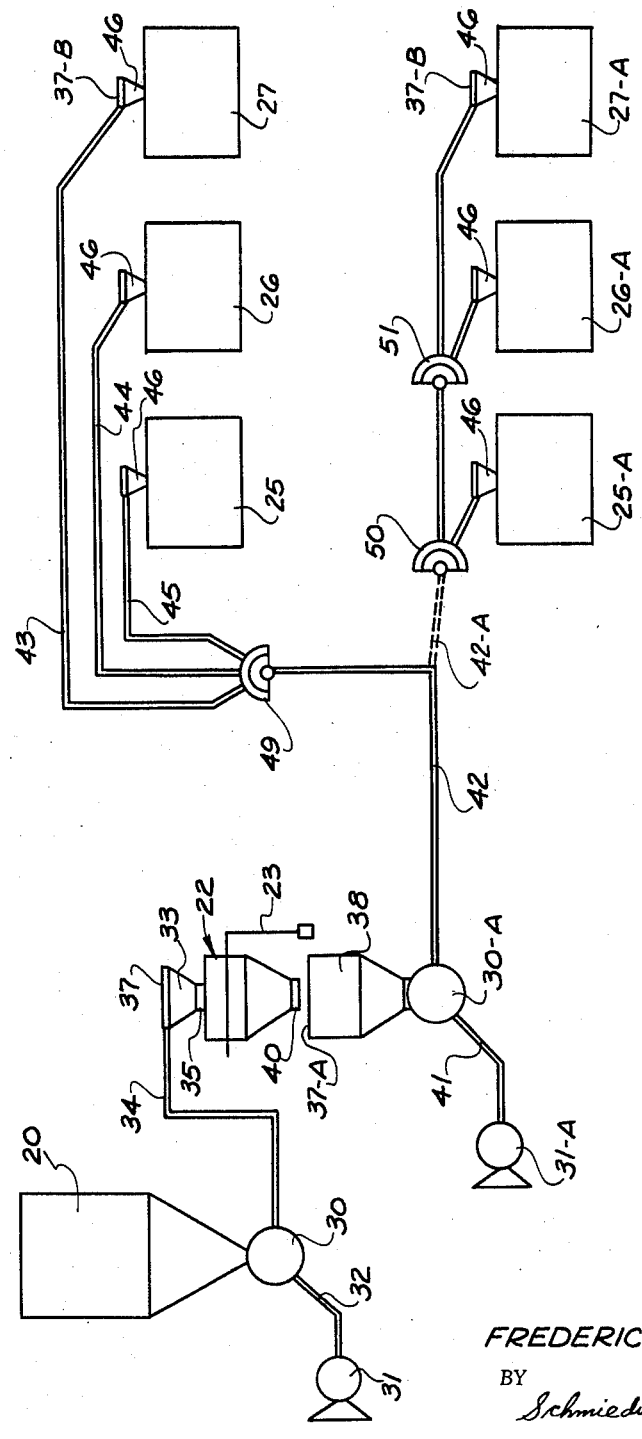
Figure 1 is a diagrammatic view of a flour handling system constructed according to the present invention and comprising one aspect thereof.

Referring in detail to the drawing, Figure 1 illustrates a system, constructed according to the present invention, which system includes a storage bin 20 for containing a supply of flour to be delivered to a scale hopper indicated generally at 22. Scale hopper 22 includes a weighing apparatus indicated diagrammatically at 23 whereby charges of flour are successively weighed and selectively delivered to each of a plurality of mixers 25, 26, and 27 or to each of a second plurality of mixers 25–A, 26–A, and 27–A.

As seen in Figure 1, flour from storage bin 20 is delivered to a rotary feeder 30 which receives a flow of air from a blower 31 via a line 32. Rotary feeder 30 serves the function of adding the particles of flour to the flow of air in a controlled manner whereby the particles become suspended in the flowing air and behave like a fluid. By this method the flour is efficiently transported to a residue hopper 33 via a conduit 34. In general the construction of rotary feeder 30 comprises a cylindrical compartment containing a shaft carrying radially extending blades, not illustrated. The shaft and blades are rotated to successively align compartments of flour with the air flow from conduit 32 and blower 31.

With continued reference to Figure 1 the outlet of residue hopper 33 leading to scale hopper 22 is provided with a shut-off valve 35. When a charge of flour is being delivered to scale hopper 22 the flow of flour and air enters residue hopper 33 via line 34 and the flour passes through residue hopper 33 and valve 35 to scale hopper 22 since valve 35 is maintained open during the delivery of the charge to the scale hopper. The air from the flow of flour and air entering residue hopper 33 is vented to the environment through a filter cover 37 formed of fabric or the like.

The outlet of scale hopper 22 leading to a receiver 38 is provided with a suitable shut-off valve 40. A preferred valve construction and pneumatic actuating mechanism for shut-off valve 40 is described in detail in my co-pending application Serial Number 564,831 filed February 10, 1956, now Patent No. 2,858,966, November 4, 1958. When a charge of flour is being weighed in scale hopper 22 the outlet thereof is of course closed by maintaining valve 40 in its closed position.

As seen in Figure 1, after a charge of flour has been weighed in scale hopper 22 such charge is transferred to receiver 38 by opening valve 40, which valve is preferably automatically actuated by a suitable control mechanism operatively associated with the weighing apparatus 23 of scale hopper 22. The air within receiver 38 that is displaced by the delivered charge of flour is released to the environment through a filter cover 37–A formed of fabric or the like. The charge of flour delivered to receiver 38 is next transferred to one of the mixers 25, 26, or 27 in the parallel delivery circuit illustrated via a flow of air from a blower 31–A and conduit 41 leading to a rotary feeder 30–A. The flow of flour and air leaving the rotary feeder passes through conduit 42, selector valve 49 and one of the conduits 43, 44, or 45 leading to a cyclone collector 46. Each of the cyclone collectors 46 includes an outlet communicating with a respective mixer and a filter cover 37–B through which air is released to the environment.

An alternate mixer circuit for Figure 1 is illustrated by the series connected mixers 25–A, 26–A, and 27–A which are selectively connectable to the outlet of rotary feeder 30–A via conduit 42–A and selector valves 50 and 51. Each of the series connected mixers 25–A, 26–A, and 27–A includes a cyclone collector 46 provided with a filter cover 37–B whereby the flour is delivered to the mixers and their air released to the environment.

In operation of the system of Figure 1, blower 31 and rotary and rotary feeder 30 are actuated with valve 35 in an open position and valve 40 in a closed position. After the desired weight of flour has been delivered to scale hopper 22 valve 35 is automatically closed by a suitable control mechanism operatively associated with the weighing mechanism 23 of scale hopper 22. The operation of rotary feeder 30 is also terminated by a suitable control mechanism operatively associated with the weighing apparatus, but blower 31 is allowed to continue to deliver a flow of air through conduit 34 until such conduit has been cleared of the line charge of flowing flour and vehicle air. The flour in the line charge will of course be delivered to residue hopper 37 and retained therein until valve 35 is opened upon institution of the delivery of the next charge to the scale hopper.

After the weighed charge has been delivered to scale hopper 22 it is rapidly transferred through valve 40 to receiver 38 from which it is conveyed to one of the mixers at a remote location. The function of receiver 38 is to rapidly clear scale hopper 22 to permit weighing of a subsequent charge while the previously weighed charge is being delivered from receiver 38 to one of the mixers. Such scale hopper and receiver constructions for central weighing are illustrated and described in detail in my co-pending applications Serial Number 564,-831 filed February 10, 1956, Serial Number 582,378 filed May 3, 1956, now abandoned.

Figure 2:
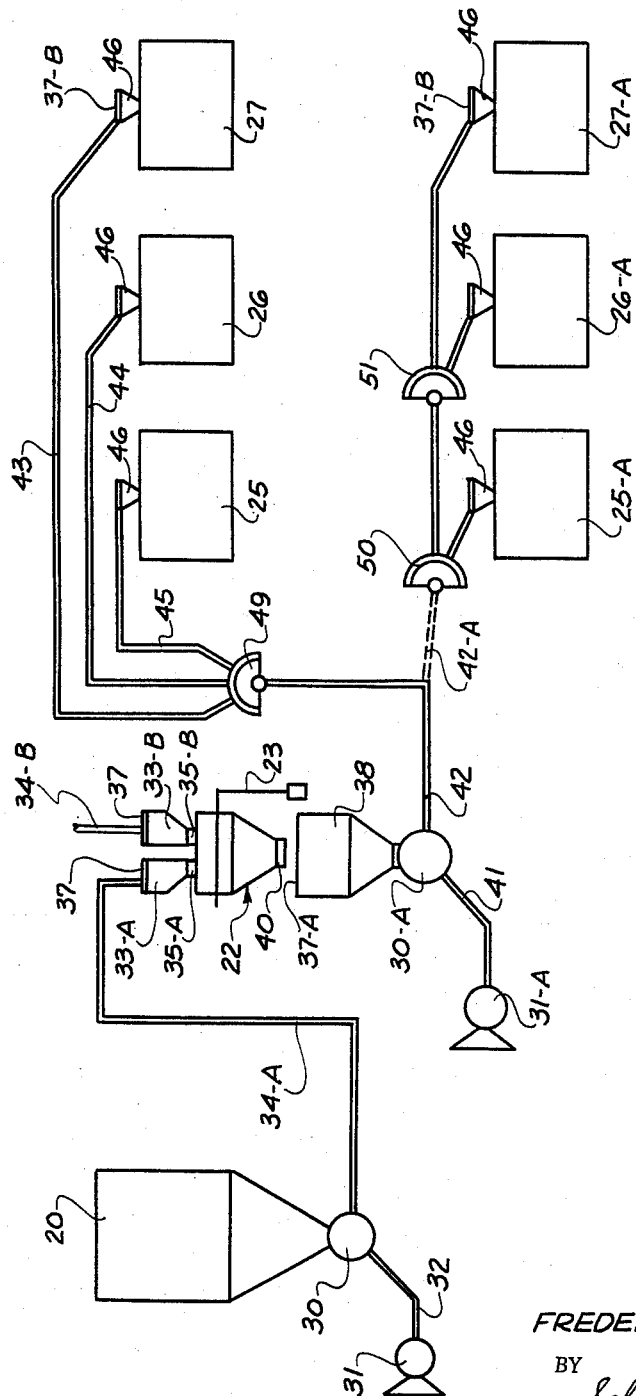
Figure 2 is a diagrammatic view of a second flour handling system constructed according to the present invention and comprising another aspect thereof.
Figure 3:
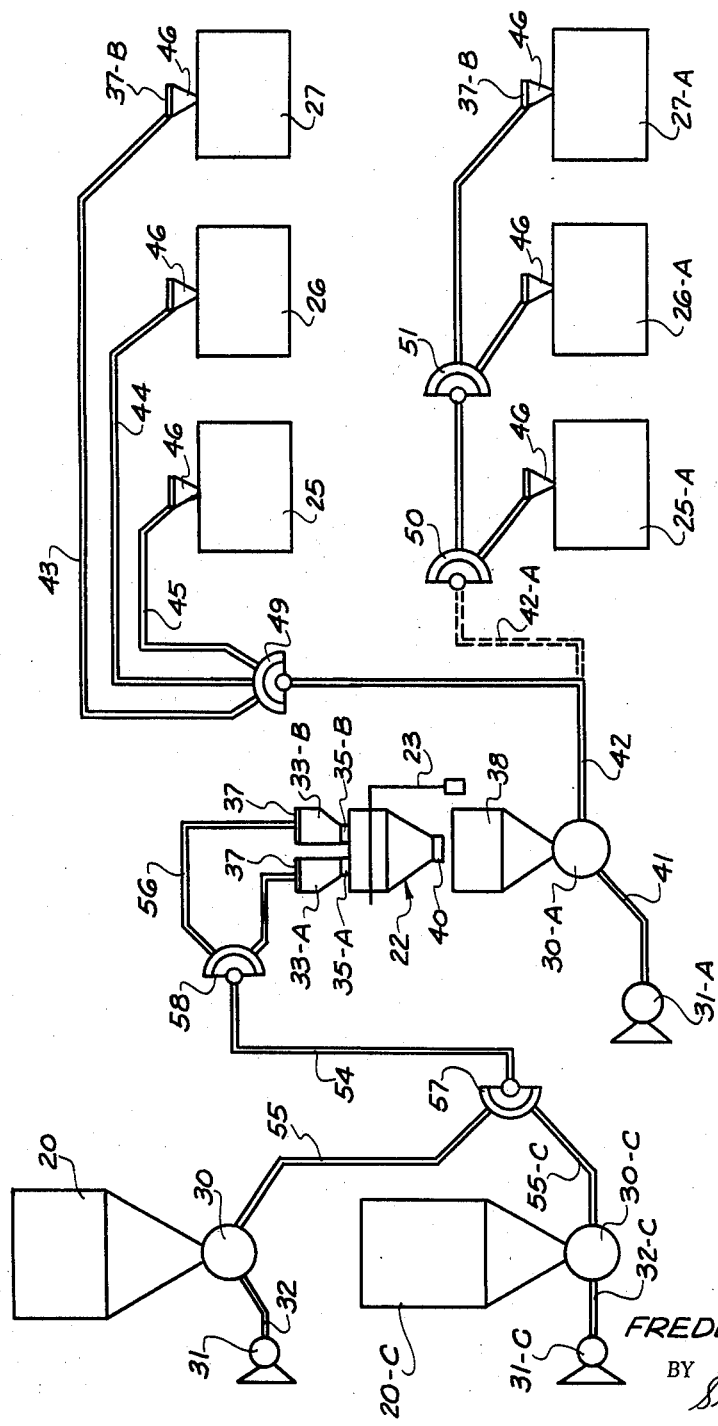
Figure 3 is a diagrammatic view of a third flour handling system constructed according to the present invention and comprising another aspect thereof.

Reference is next made to Figures 2 and 3 which illustrate systems similar to that of Figure 1 except that a plurality of flour types can be weighed in a single central scale hopper 22 in each of the systems of Figures 2 and 3 without mixing of the different types of flour.

With particular reference to the system of Figure 2, a plurality of residue hoppers 33–A and 33–B communicate with a single scale hopper 22 via shut-off valves 35–A and 35–B, respectively. A plurality of storage bins, one of which is illustrated at 20, each supply flour to a respective residue hopper 33–A or 33–B via an individual conduit 34–A or 34–B. Hence it will be understood that each storage bin 20 for each type of flour is provided with a residue hopper for receiving and retaining line charges of one type of flour while another type of flour is being delivered to scale hopper 22. All the other elements of Figure 2 that are identical to those of Figure 1 are designated by like numerals.

Figure 3, like Figure 2, is adapted to handle a plurality of flour types contained in storage bins 20 and 20–C but the conduit system between the bins and residue hoppers 33–A and 33–B incorporates a single main conduit portion 54 that is utilized in conveying flour from either of the bins 20 or 20–C. As seen in Figure 3, flour is conveyed from bin 20 to a respective residue hopper 33–A or 33–B via conduit portions 55, 54, and 56 and selector valves 57 and 58. Flour from bin 20–C is delivered to a respective residue hopper 33–A or 33–B via conduit portions 60, 54, and 61, and selector valves 57 and 58. The components of the system of Figure 3 that are identical to those of the system of Figure 1 are designated by like numerals and the operation of such components is the same as previously described in connection with the description of the system of Figure 1.

Figure 4:
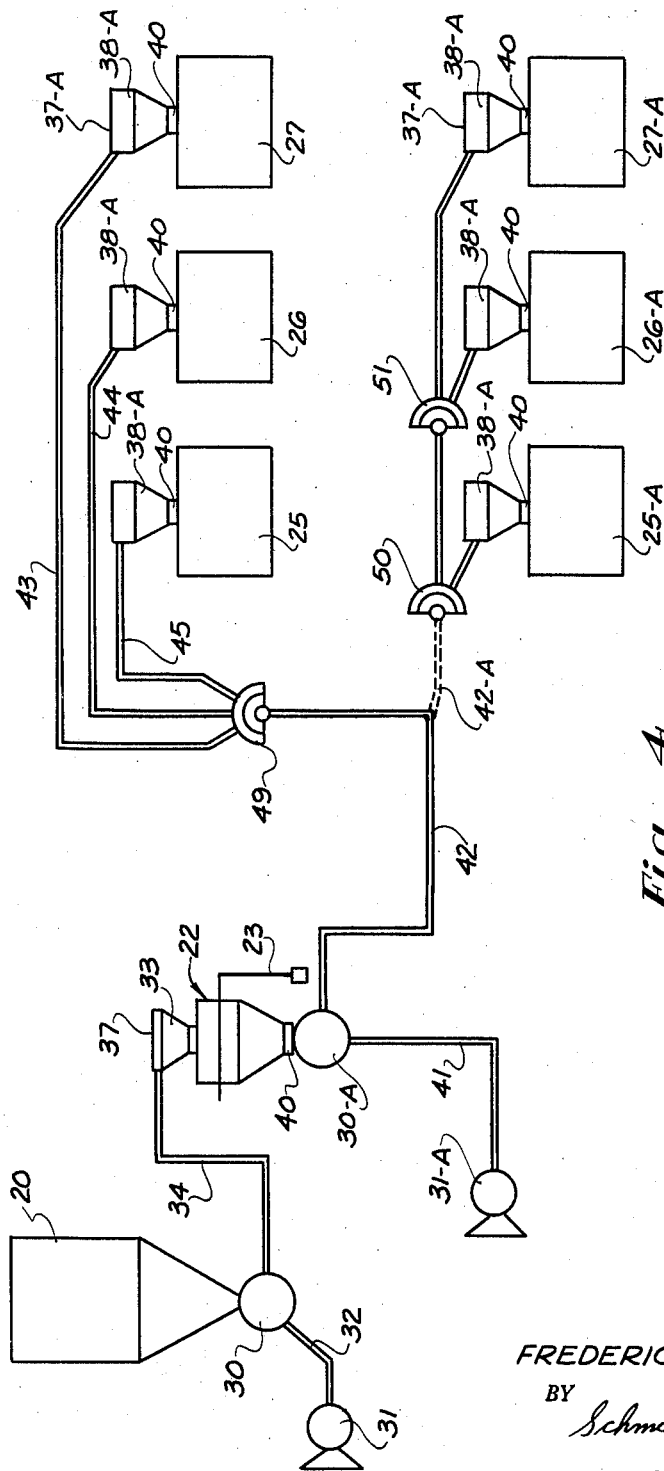
Figure 4 is a diagrammatic view of a fourth flour handling system constructed according to the present invention and comprising another aspect thereof.

Reference is next made to the systems of Figures 4, 5, and 6 which are identical to the systems of Figures 1, 2, and 3, respectively, except that the systems of Figures 4, 5, and 6 each incorporates a plurality of receivers 38–A located remotely from a single central scale hopper 22. As seen in Figure 3, each of the plurality of receivers 38–A is located above a respective mixer and includes a shut-off valve 40 whereby flour can be collected in a receiver 38–A while the corresponding mixer is mixing the previously delivered charge of flour. Hence it will be understood that the systems of Figures 4, 5, and 6 are identical in apparatus and function to the previously described systems of Figures 1, 2, and 3 except that the plurality of remotely located receivers 38–A replace the single receiver 38 located at the central weighing station.

Reference is next made to Figure 7 which illustrates still another system constructed according to the present invention which system also incorporates residue hoppers 33–A for receiving the line charge of flour whereby the delivery conduits can be cleared after a weighed charge has been delivered to a scale hopper. The system of Figure 7 differs from those of the preceding figures in that it incorporates a plurality of scale hoppers 22–A, one for each of a plurality of mixers 25, 26, and 27 or 25–A, 26–A, and 27–A. Hence it will be understood that although the system of Figure 7 does not provide central weighing from a single central scale hopper, such as hopper 22 in Figure 1, the system of Figure 7 does incorporate residue hoppers 33–A for receiving line charges of flour whereby the lines can be cleared after the weighing of each charge.

In operation of the system of Figure 7, a flow of flour and air can be selectively delivered from any one of a plurality of storage bins such as are illustrated at 20 and 20–C. A flow is delivered from bin 20 to a common conduit portion 54 via blower 31, line 32, rotary feeder 30, line 55 and selector valve 57. A flow from bin 20–C can be delivered to common conduit portion 54 via blower 31–C, line 32–C, rotary feeder 30–C line 55–C and selector valve 57. The flow of flour and air in common conduit portion 54 is delivered to any one of the plurality of scale hoppers 33–A in the parallel delivery circuit via a selector valve 49 and one of the lines 43, 44, or 45. In passing to a scale hopper 22–A the flow of flour and air enters a residue hopper 33–A and the air is vented to the environment through a cover portion 37. The separated flour passes through a valve 35–A which is maintained open while the charge of flour is being delivered to a scale hopper 22–A. When the desired weight of flour has been delivered to a scale hopper 22–A a suitable control mechanism, operatively responsive to the weighing apparatus 23 of the scale hopper, closes valve 35–A at the outlet of residue hopper 33–A. The operation of rotary feeder 30 or 30–C is also terminated when the desired weight of flour has been delivered to the scale hopper by a suitable control mechanism operatively responsive to the weighing apparatus 23 of the scale hopper but the operation of blower 31 or 31–C is continued for a period of time sufficient to clear the line charge of flour from the conduit portions being used such as 55, 54, and 43. The weighed charge of flour is released from a scale hopper 22–A to a respective mixer 25, 26, or 27 by opening a shut-off valve 40 at the outlet of the scale hopper. After a weighed charge has been released to a mixer a subsequent charge can be delivered to the scale hopper 22–A for the mixer at the same time the mixing operation is being conducted.

With continued reference to Figure 7, as an alternative a series type mixer circuit can be employed as is illustrated by the plurality of mixers 25–A, 26–A, and 27–A. In such series type circuit the flowing flour and air in common conduit portion 54 is selectively delivered to any one of the plurality of scale hoppers 22–A by means of conduit portion 42–A and selector valves 50 and 51.

In the operation of each of the previously described systems the shut-off valve or valves 40 at the outlet of the scale hopper 22 or scale hoppers 22–A are preferably automatically actuated by a suitable control mechanism operatively responsive to the weighing apparatus 23 of the scale hopper. Hence the systems are made completely automatic in that not only are line charges automatically cleared from the conduits but, in addition, the weighed charges are automatically released to a receiver 38, rotary feeder 31–A, or directly to a mixer as the case may be.

While the forms of embodiments of the present invention as herein disclosed constitute preferred forms, it is to be understood that other forms might be adopted, all coming within the scope of the claims which follow.

I claim:

1. A pneumatic conveying system for handling finely divided particles comprising, in combination, storage means for a supply of said particles; conduit means leading from said storage means; pneumatic particle conveying means for delivering a flow of particles and air through said conduit means; a scale hopper for receiving and weighing charges of said particles from said storage means, said scale hopper including an inlet and an outlet; a first valve means for said outlet of said scale hopper; a residue hopper including an inlet communicating with said conduit means and an outlet communicating with said scale hopper; means for venting air from said residue hopper; a second valve means for said inlet of said scale hopper, said valve means including a normally open position during operation of said pneumatic conveying means whereby said flow of particles and air is delivered to said scale hopper and a closed position wherein said flow is delivered to said residue hopper to deposit the conduit line charge therein; and control means for said second valve means for moving said valve means from said normally open position to said closed position responsive to the weighing of a charge at said scale hopper.

2. A pneumatic conveying system for handling finely divided particles comprising, in combination, storage means for a supply of said particles; conduit means leading from said storage means; pneumatic particle conveying means for delivering a flow of particles and air through said conduit means; a scale hopper for receiving and weighing charges of said particles from said storage means, said scale hopper including an inlet and an outlet; a first valve means for said outlet of said scale hopper; a residue hopper including an inlet communicating with said conduit means and an outlet communicating with said scale hopper; means for venting air from said residue hopper; a second valve means for said inlet of said scale hopper, said valve means including a normally open position during operation of said pneumatic conveying means whereby said flow of particles and air is delivered to said scale hopper and a closed position wherein said flow is delivered to said residue hopper to deposit the conduit line charge therein; a mixer for receiving said charges of particles from said scale hopper; and control means for said second valve means for moving said valve means from said normally open position to said closed position responsive to the weighing of a charge at said scale hopper.

3. A pneumatic conveying system for handling finely divided particles comprising, in combination, storage means for a supply of said particles; conduit means; particle feeding means for delivering particles from said storage means to said conduit means; a scale hopper for receiving and weighing charges of said particles from said storage means, said scale hopper including an outlet; a first valve means for said outlet of said scale hopper; a residue hopper including an inlet communicating with said conduit means and an outlet communicating with said scale hopper; means for venting air from said residue hopper; a second valve means for said outlet of said residue hopper, said second valve means including a normally open position wherein a flow of particles and air from said conduit means passes through said residue hopper and into said scale hopper, said second valve means including a closed position wherein said flow is delivered to said residue hopper to deposit the conduit line charge therein; a mixer for receiving said charges of particles from said scale hopper; and control means for said second valve means and said particle feeding means for moving said valve means from said normally open position to said closed position responsive to the weighing of a charge at said scale hopper.

4. A pneumatic conveying system for handling finely divided particles comprising, in combination, storage means for a supply of said particles; conduit means leading from said storage means; pneumatic particle conveying means for delivering a flow of particles and air through said conduit means; a scale hopper for receiving and weighing charges of said particles from said storage means, said scale hopper including an inlet and an outlet; a first valve means for said outlet of said scale hopper; a residue hopper including an inlet communicating with said conduit means and an outlet communicating with said scale hopper; means for venting air from said residue hopper; a second valve means for said inlet of said scale hopper, said valve means including a normally open position during operation of said pneumatic conveying means whereby said flow of particles and air is delivered to said scale hopper and a closed position wherein said flow is delivered to said residue hopper to deposit the conduit line charge therein; a plurality of receivers each of which includes an inlet and an outlet; a third valve means for selectively connecting said plurality of receivers with said outlet of said scale hopper; a plurality of mixers including inlets communicating with said outlets of said plurality of receivers; a plurality of fourth valve means, one for ecah outlet of each of said plurality of receivers; and control means for said second valve means for moving said valve means from said normally open position to said closed position responsive to the weighing of a charge at said scale hopper.

5. A pneumatic conveying system for handling finely divided particles comprising, in combination, storage means for a supply of said particles; conduit means; particle feeding means for delivering particles from said storage means to said conduit means; a scale hopper for receiving and weighing charges of said particles from said storage means, said scale hopper including an outlet; a first valve means for said outlet of said scale hopper; a residue hopper including an inlet communicating with said conduit means and an outlet communicating with said scale hopper; means for venting air from said residue hopper; a second valve means for the inlet of said scale hopper, said second valve means including a normally open position wherein a flow of particles and air from said conduit means passes through said residue hopper and into said scale hopper, said second valve means including a closed position wherein said flow is delivered to said residue hopper to deposit the conduit line charge therein; a plurality of receivers each of which includes an inlet and an outlet; a third valve means for selectively connecting said plurality of receivers with said outlet of said scale hopper; a plurality of mixers including inlets communicating with said outlets of said plurality of receivers; a plurality of fourth valve means, one for each outlet of each of said plurality of receivers; and control means for said second valve means for moving said valve means from said normally open position to said closed position responsive to the weighing of a charge at said scale hopper.

References Cited in the file of this patent

UNITED STATES PATENTS

| | | |
|---|---|---|
| 2,572,862 | Israel | Oct. 30, 1951 |
| 2,688,517 | Riordan | Sept. 7, 1954 |
| 2,688,518 | Krenke | Sept. 7, 1954 |
| 2,795,463 | Weller | June 11, 1957 |
| 2,810,609 | Temple | Oct. 22, 1957 |